United States Patent

Sauerland

[11] Patent Number: 5,873,274
[45] Date of Patent: Feb. 23, 1999

[54] LOCKING DEVICE FOR RIGHT AND LEFT HANDED DOORS WITH FOLDING HANDLE

[75] Inventor: Manfred Sauerland, Essen, Germany

[73] Assignee: EMKA Beschlagtaile GmbH & Co. KG, Velbert, Germany

[21] Appl. No.: 976,027

[22] Filed: Nov. 21, 1997

Related U.S. Application Data

[63] Continuation of Ser. No. 505,733, Jul. 21, 1995, abandoned.

[30] Foreign Application Priority Data

Jul. 22, 1994 [DE] Germany ............... 44 25 970.0

[51] Int. Cl.⁶ .................................................. B60R 25/02
[52] U.S. Cl. .............................. 70/208; 70/215; 70/462; 292/336.3
[58] Field of Search ............................ 70/190, 208–210, 70/215–217, 221, 224, 450, 451, 452, 455, 462, 466; 292/DIG. 30, DIG. 31, 336.3

[56] References Cited

U.S. PATENT DOCUMENTS

| 4,631,937 | 12/1986 | Debus et al. ........................... 70/208 X |
| 4,754,624 | 7/1988 | Fleming et al. ....................... 70/462 X |
| 4,930,325 | 6/1990 | Ramsauer .............................. 70/215 X |
| 5,303,971 | 4/1994 | Johnsen et al. ....................... 70/208 X |
| 5,321,962 | 6/1994 | Ferchau .................................... 70/208 |
| 5,347,834 | 9/1994 | Ramsauer .............................. 70/208 X |
| 5,419,167 | 5/1995 | Yamada et al. ....................... 70/462 X |
| 5,638,709 | 6/1997 | Clavin ....................................... 70/208 |
| 5,685,181 | 11/1997 | Ramsauer ................................ 70/208 |

FOREIGN PATENT DOCUMENTS

| 261267 | 9/1986 | European Pat. Off. . |
| 504044 | 3/1992 | European Pat. Off. . |
| 9306324 | 4/1993 | France . |

*Primary Examiner*—Suzanne Dino Barrett
*Attorney, Agent, or Firm*—Robert W. Becker & Associates

[57] ABSTRACT

A locking device for a switch cabinet has at least one locking rod for locking the door of the switch cabinet. An actuating element for displacing longitudinally the at least one locking rod for locking and unlocking the door is provided. A handle is connected to the exterior of the door so as to be foldable and rotatable. The handle has a transmission shaft for coupling the handle to the actuating element which is activated by rotating the handle. A plate-shaped member is connected to the exterior of the door and has a depression for receiving the handle. In its folded position the handle is flush with the plate-shaped member. The plate-shaped member has a receiving portion adjacent to the depression. At least one lock for locking the handle is positioned in the receiving portion at an angle relative to the plane of folding of the handle. A transmission element is coupled to the lock and slidable within the receiving portion for locking and unlocking the handle when acted upon by the lock. The depression has two opposite ends with a cutout. The transmission shaft is supported at and extends through one of the cutouts.

10 Claims, 4 Drawing Sheets

LOCKING DEVICE FOR RIGHT AND LEFT HANDED DOORS WITH FOLDING HANDLE

This application is a continuation of application Ser. No. 08/505,733 filed Jul. 21, 1995 and now abandoned.

BACKGROUND OF THE INVENTION

The present invention relates to a locking device for switch cabinets etc. comprising an actuating element for displacing in the longitudinal direction at least one locking rod for locking the door whereby the actuating element for its actuation is coupled with a handle that is connected to a transmission shaft and mounted to the exterior of the door which handle is foldable, and further comprising a plate-shaped member arranged on the exterior of the door and provided with a depression for receiving the handle in a flush arrangement, wherein the handle is lockable with a lock positioned within the plate-shaped member. A locking device of the aforementioned kind is, for example, known from WO 93/06324 in which the lock is positioned on an extension of the handle within the plate-shaped member for locking the handle at its end face.

Such locking devices are subject to regulations according to which the handle for opening the locking device must be pivoted in the direction of the center of the door panel so that the direction of rotation of the handle is thus predetermined and different for a right-hand, respectively, left-hand door. This is disadvantageous because manufacturers of switch cabinets etc. must have in stock doors with fixedly mounted locking devices with a pivotable handle for right-hand as well as left-hand doors. This is, of course, expensive. It is, in general, possible to dismount and remount the pivot handle when the door is to be changed from a right hand to a left hand door; however, demounting and remounting of the locking device with pivotable handle requires a considerable expenditure. For example, the locking device known from WO 93/06324, as can be easily seen from the disclosure, cannot be changed over without a considerable expenditure.

It is therefore an object of the present invention to provide a locking device with a folding handle with which a change over of the door from a right-hand to a left-hand use is simplified.

SUMMARY OF THE INVENTION

A locking device for a switch cabinet according to the present invention is primarily characterized by:

At least one locking rod for locking a door of the switching cabinet;

An actuating element for displacing the at least one locking rod in a longitudinal direction thereof for locking and unlocking the door;

A handle connected to the exterior of the door so as to be foldable and rotatable, the handle comprising a transmission shaft for coupling the handle to the actuating element, wherein the actuating element is activated by rotating the handle;

A plate-shaped member, connected to the exterior of the door, the plate-shaped member comprising a depression for receiving the handle, wherein in a folded position of the handle the handle is flush with the plate-shaped member;

The plate-shaped member comprising a receiving portion adjacent to the depression;

At least one lock positioned within the receiving portion for locking the handle when folded into the depression, the lock positioned at an angle relative to a plane in which the handle is folded;

A transmission element coupled to the at least one lock and slidable within the receiving portion for locking and unlocking the handle when acted upon by the at least one lock;

The depression having two opposite ends with a cutout, wherein the transmission shaft is supported at and extends through one of the cutouts.

Preferably, the lock is arranged in the receiving portion so as to be parallel to the plane of the door.

In the alternative, the lock is arranged in the receiving portion so as to be at a slant relative to the plane of the door.

Advantageously, two such locks are positioned in the receiving portion.

In a preferred embodiment of the present invention, the receiving portion has a back side placed on the door and a front side facing away from the door. The receiving portion comprises a lock receiving opening for each one of the locks and the lock receiving opening is accessible from the back side. The front side has a key hole for each one of the locks for accessing the lock.

Preferably, the locking device further comprises a cover element for one of the key holes.

Preferably, the device further comprises a lock box in which the at least one locking rod is guided. The lock box is fixedly connected to the door. The actuating element comprises two pinions positioned in the lock box for driving the at least one locking rod. Each one of the pinions is positioned at one of the cutouts. The transmission shaft of the handle engages one of the pinions for driving the at least one locking rod.

Advantageously, the lock box is a unitary part and extends over the length of the depression.

In a preferred embodiment of the present invention, the lock box comprises two box parts coordinated with the cutouts. Each one of the box parts contains one of the pinions, and the lock box further comprises a bridging member for connecting the box parts to form a unitary lock box.

Advantageously, the plate-shaped member has a recess at a side thereof placed onto the door. The recess preferably extends over the length of the depression and is shaped according to the contour of a lock cover plate mounted to the door.

Accordingly, the invention is based on the following features: the plate-shaped member is provided with a receiving portion positioned adjacent to the depression for receiving the lock or locks positioned at an angle to the plane of movement defined by the folding action of the handle, a transmission element which is guided in the receiving portion and actuated by the lock or locks for locking, respectively, unlocking the handle within the depression; and a cutout is provided at each end of the depression for supporting thereat and guiding therethrough the transmission shaft of the handle.

The invention is characterized by the advantage that for a changeover of the door it is only necessary to remove the handle together with the transmission shaft from the depression of the plate-shaped member and after changing over the door (i.e., rotate it by 180°) to return it into the depression of the plate-shaped member which is possible according to the present invention because the lock for locking the handle in the plate-shaped member is positioned laterally to the plane of folding of the handle so that upon changing over the door and thus turning the plate-shaped member mounted on the door its position relative to the handle has not been changed. At the same time, the depression for receiving the handle is embodied with respect to supporting and guiding the transmission shaft symmetrically so that a switching of the handle in itself is sufficient.

According to certain embodiments of the invention it is suggested that the lock is positioned within the receiving portion of the plate-shaped member parallel to the plane of the door or at a slight slant relative to the plane of the door, whereby with the latter option the accessibility of the key hole within the plate-shaped member is improved. According to another embodiment of the invention the receiving portion of the plate-shaped member is designed to receive two locks acting on only one transmission element. This has the advantage that different lock systems with different access codes can be used. For example, it is possible to use locks with different keys or locks of a different construction, for example, magnetic card locks, cylinder locks etc. within one locking device.

In one particular embodiment of the invention the receiving portion of the plate-shaped member is provided at the back side of the plate-shaped member with lock receiving openings for a corresponding lock. The plate-shaped member is placed onto the door and is provided at its front side with key holes corresponding to the shape and construction of the lock (the term "key hole" is meant to include openings for magnetic cards, keys, and other lock-activating devices). According to another embodiment of the invention one of the two keyholes may be covered by a cover element so that only one lock is to be used for locking the handle. In this context it is possible upon changing over the door and thus the plate-shaped member, to either leave the lock in the respective receiving opening, so that only a slight position change of the lock occurs, or to remove the lock and place it into the other receiving opening after changing over the door.

In prior art locking devices in which the actuating element is in the form of a lock box in which is guided at least one locking rod and which comprises a pinion coupled to the handle for driving the locking rod, it is disadvantageous that upon changing over the door the lock box must also be changed over so as to receive the handle in the respectively other cutout. According to the present invention it is suggested that the lock box contain two pinions which are respectively coordinated with one cutout for supporting and guiding the transmission shaft of the handle. With such a design a changing over of the lock box upon changing over the door is not required because upon mounting the handle in the plate-shaped member the transmission shaft connected to the handle can be inserted into the respective pinion of the lock box so that the required transmissive connection is instantly provided.

According to another embodiment of the invention the lock box is a unitary part which extends over the length of the depression within the plate-shaped member. The two pinions contained therein are aligned with the corresponding cutouts of the depression. In an alternative embodiment it is possible to provide the lock box in the form of box parts coordinated with the cutouts of the depression. Each box part contains a respective one of the pinions whereby the box parts are connected by a bridging member (sheet metal part) with one another to form a unitary part.

According to a further embodiment of the invention the locking device is to be mounted onto a door which is already provided with a cover plate for a lock. Such a cover plate for a lock has a transmission shaft arranged therein for receiving a key for rotating the transmission shaft and is known, for example, from European patent 0 261 267. Inasmuch as doors are already provided with such lock cover plates, a demounting of the cover plate upon mounting a locking device with folding handle thereto should be avoided. For this purpose it is suggested according to the present invention that the plate-shaped member at the back side facing the door is provided with a recess extending over the length of the depression. The recess is to be shaped according to the contour of the cover plate for mounting the plate-shaped member onto the cover plate already fastened to the door so that in an advantageous manner without demounting the cover plate the plate-shaped member can be placed onto the cover plate whereby the handle engages the actuating member provided with the already present cover plate.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing the FIGS. 1 through 4.

Figure 1:
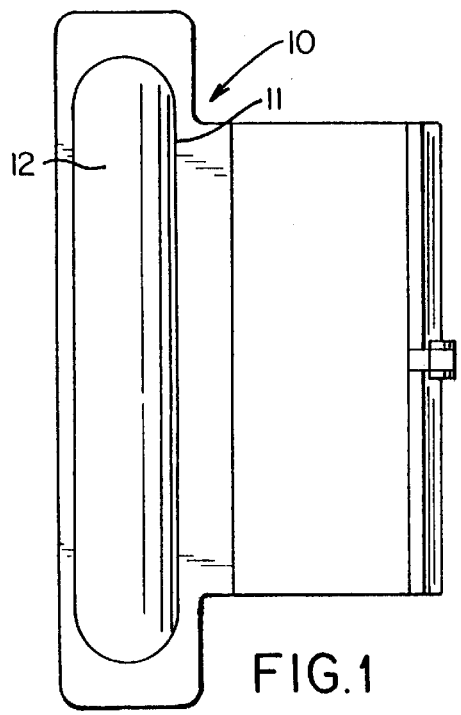
FIG. 1 shows a locking device with foldable handle in a front view.
Figure 2:
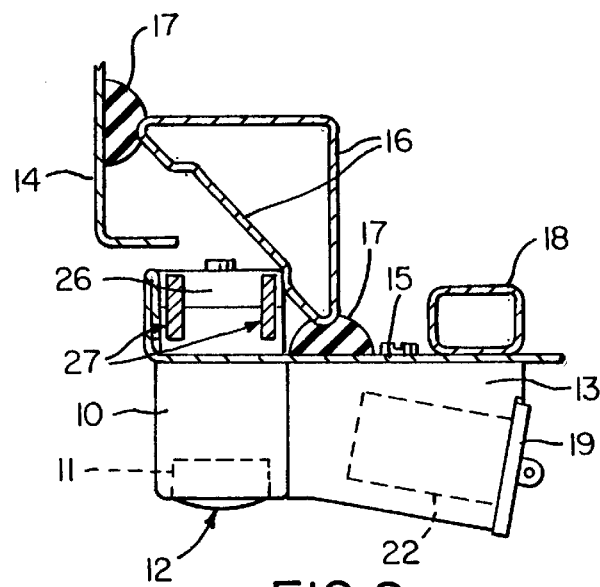
FIG. 2 shows a plan view of the inventive locking device mounted onto a door.

As can be seen in detail when viewing FIGS. 1 and 2, the inventive locking device with folding handle is provided with a plate-shaped member 10 to be mounted onto the exterior side of a door panel 15 of a door. The plate-shaped member 10 is provided at one side with a depression 11 for receiving a handle 12. Adjacent to the depression 11 a receiving portion 13 for one or more locks, which will be described in detail in the following, for locking the handle 12 in the depression 11 is provided.

The arrangement of the plate-shaped member 10 can be seen in detail in FIG. 2 which illustrates the angled sidewall 14 and the door panel 15 positioned in front of it. Sidewall 14 and door panel 15 come together in an area which is delimited by a reinforcement corner member 16 whereby sidewall 14 and door panel 15 are sealed relative to the corner member 16 by seals 17. A further component of the cabinet construction is a spar 18.

Figure 3:
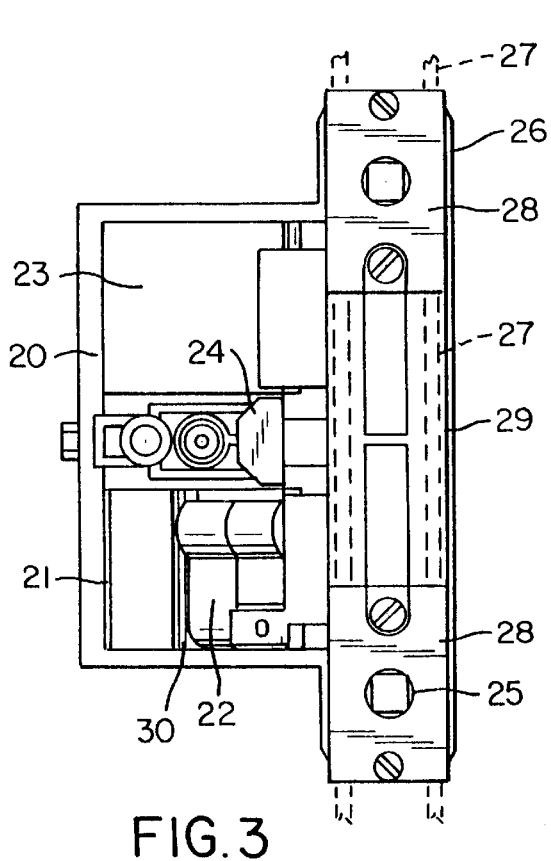
FIG. 3 shows the backside of the inventive locking device of FIG. 1.
Figure 4:
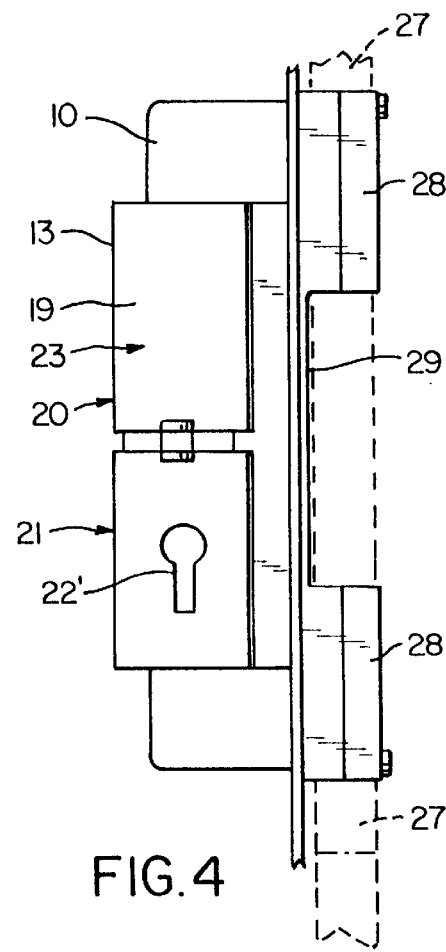
FIG. 4 shows a side view of the inventive locking device.

As can be seen further in FIGS. 2 and 3, the receiving portion 13 has a lateral surface 19 which extends at a slight slant relative to the door panel 15 and which faces away from the depression 11. The side surface 19 is provided with a key hole for inserting a key or other lock-actuating device into the lock positioned in the receiving portion 13. The receiving portion 13 is divided into an upper part 20 and a lower part 21 whereby between these two parts 20, 21 a transmission element 24 is arranged which ensures upon actuation of the lock or locks positioned within the parts 20, 21 that the handle 12 within the depression 11 is released into the extended position or is locked within the depression 11 when folded. In the shown embodiment only the lower part 21 of the receiving portion 13 is provided with a cylinder lock 22 having keyhole 22' while the upper part 20 with its receiving opening 30 is covered by a cover element 23.

At the inner side of the door panel 15 a lock box 26 is fastened with screws and extends over the entire length of the plate-shaped member 10. The lock box 26 is provided with pinions 31, visible in the rearview of the locking device, which are coordinated with the cutouts 25 at the two ends of the depression 11 of the plate-shaped member 10 for receiving of the transmission shaft 35 coupled to the handle 12 whereby each pinion 31 is positioned in a box part 28 and is fixedly connected to the transmission shaft. According to the representation of FIG. 4 the two lock box parts 28 are connected with one another by a bridging member 29 in order to form a unitary lock box 26. The lock box 26, respectively, the two box parts 28 contain the locking rods 27 which can be longitudinally displaced by the pinions.

Figures 5, 7A:
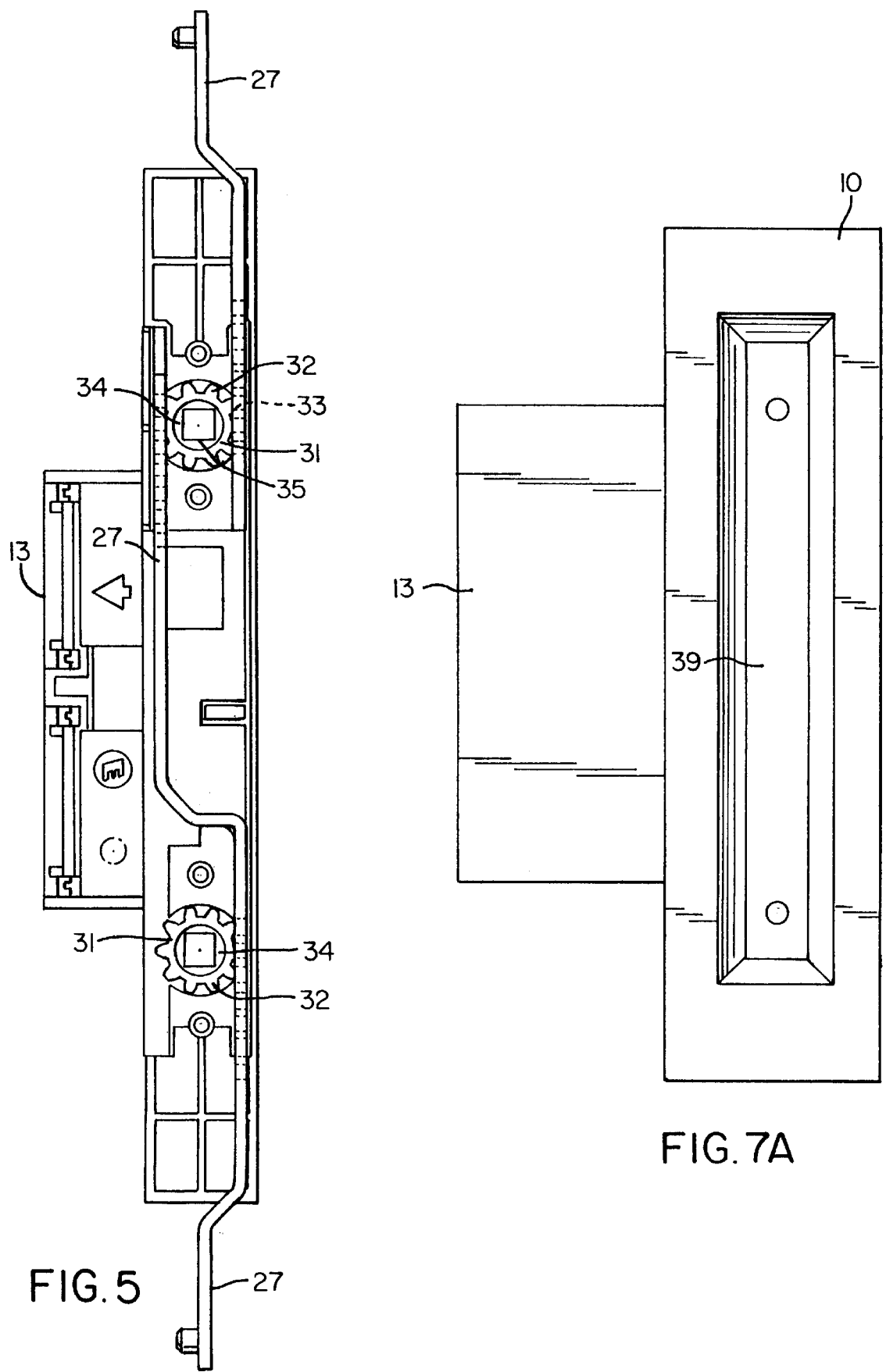
FIG. 5 shows the backside of a collapsible locking device corresponding to FIG. 3 with the lock caps removed.
FIG. 7a shows the locking device of FIG. 7 with recess in a back view.

The function of the locking device will be explained in more detail with the aid of FIGS. 5 and 6. In FIG. 5 the covers shown in FIG. 3 of the lock box 26, respectively, of the box parts 28 have been removed so that the pinions 31 positioned in each one of the box parts 28 are visible. The pinions 31 have an outer toothing 32 engaging respective recesses 33 on the locking rods 27 so that with a rotation of the pinions 31 the respective locking rod 27 is displaced in the longitudinal direction. In FIG. 5 it can be seen that the upper bearing 34 of the pinion 31 is engaged by the transmission shaft 35 of the handle 12.

With the aid of FIG. 6 the release and the actuation of the handle 12 of FIG. 3 will be explained in more detail. As can be seen in the representations of FIG. 3 and 5, the handle 12 with the schematically indicated transmission shaft 35 is inserted into the upper area of the depression 11 of the plate-shaped member 10. The transmission shaft 35 penetrates the plate-shaped member 10 in order to extend into the box part 28 arranged at the backside of the door panel 15 and containing the pinion 31. The arrangement of the handle 12 in the plate-shaped member 10 includes a non-represented spring which biases the handle 12 into the extended position illustrated in FIG. 6. The handle 12 is provided at its center portion with two cutouts 36 which are engaged by the transmission element 24 when the handle 12 is in the folded position within the depression 11 in order to secure the handle 12 in the depression 11. In the embodiment represented in FIG. 6 the cylinder lock 22 is positioned in the lower portion of the receiving portion 13 of the plate-shaped member 10 within the lock receiving opening 37 arranged therein while in the upper portion of the receiving portion 13 the lock receiving opening is covered by a cover element 38.

The function of the locking device is as follows. In FIGS. 1–4 the handle 12 is shown in the folded rest position within the depression 11 of the plate-shaped member 10. For unlocking the locking device a key is inserted into the cylinder lock 22 positioned within the lock receiving opening 37 and the lock 22 is unlocked. By doing so the transmission element 24 is pushed to the left from the position represented in FIG. 3. This displacement disengages the transmission element 24 from the cutouts 36 of the handle 12. The spring integrated in the handle arrangement forces the handle 12 out of the depression 11 into the extended position represented in FIG. 6. The handle 12 can now be gripped by the operator and can be rotated in a plane that is parallel to the door panel 15. This rotation is transmitted by the transmission shaft 35 onto the pinion 31 engaged by the transmission shaft and results in a rotation of the pinion 31. The rotation of the pinion 31, in turn, results in a displacement of the locking rods 27 because the toothing 32 engages the recesses 33 of the locking rods 27. After completion of the respective actuation, the handle 12 is folded back into the depression 11 of the plate-shaped part 10. By turning the key in the lock 22, the transmission element 24 is again brought into engagement with the cutouts 36 to thereby lock the handle 12.

The cabinet arrangement shown in FIGS. 1 and 2 corresponds to a right-hand door. When it is desired to change over the door panel 15 for the purpose of providing a left-hand door, the door panel 15 must be rotated by 180°. It is then sufficient with the inventive embodiment to remove the handle 12 from the depression 11 of the plate-shaped member 10, rotate the handle 12 about 180°, and reinsert it into the depression 11. Upon changing over the door, the arrangement of the lock box 26 with locking rods 27 relative to the door panel 15 remains intact whereby due to the symmetric arrangement of the cutouts 25 for the transmission shaft 35 positioned in the handle 12 and the lock parts 28 positioned underneath with the pinions 31 arranged therein results upon rotation of the handle 12 again in a locking device with proper function.

Figure 6:
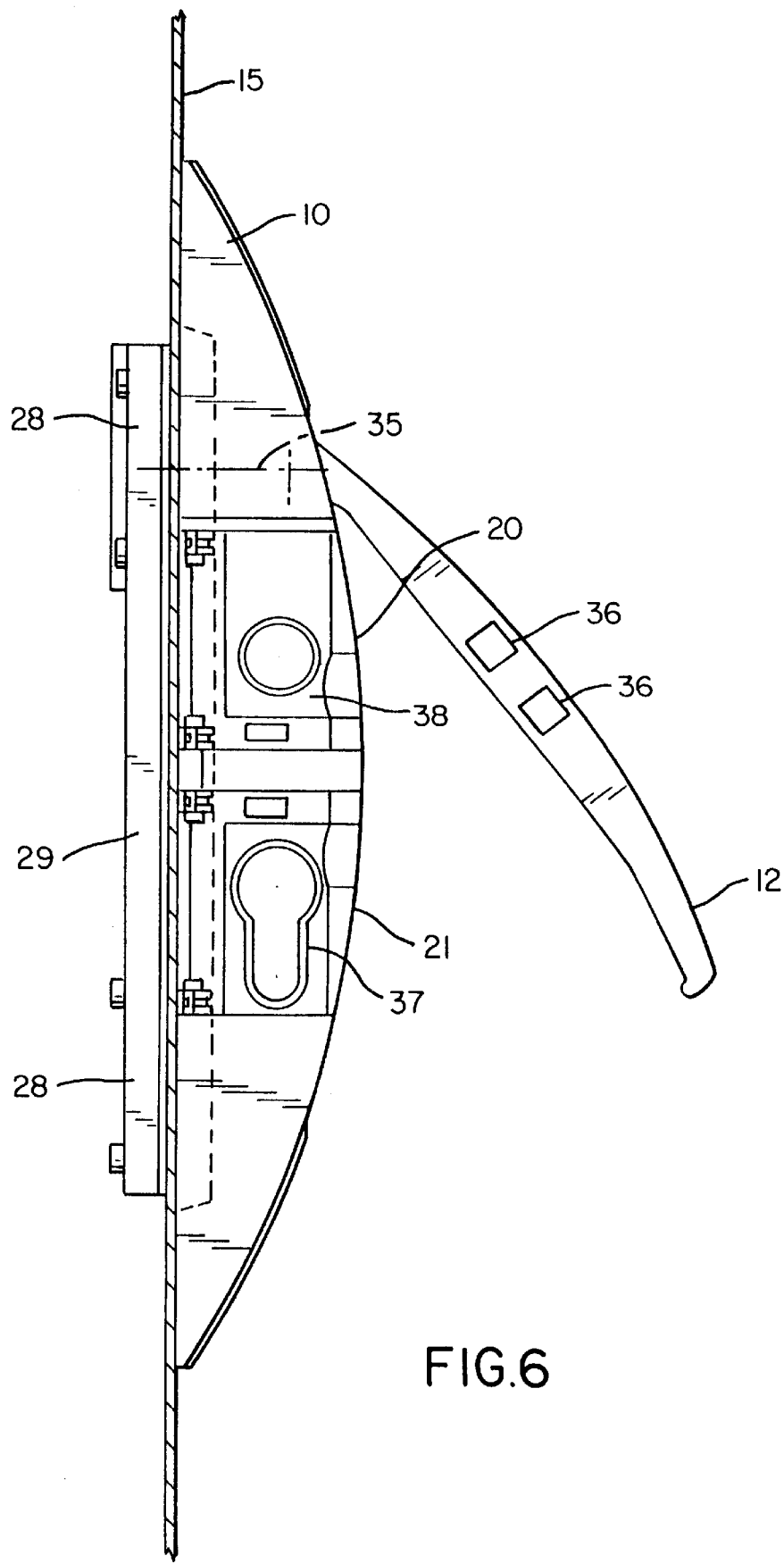
FIG. 6 shows the locking device of FIG. 4 in another embodiment with the handle in the retracted position.
Figure 7:
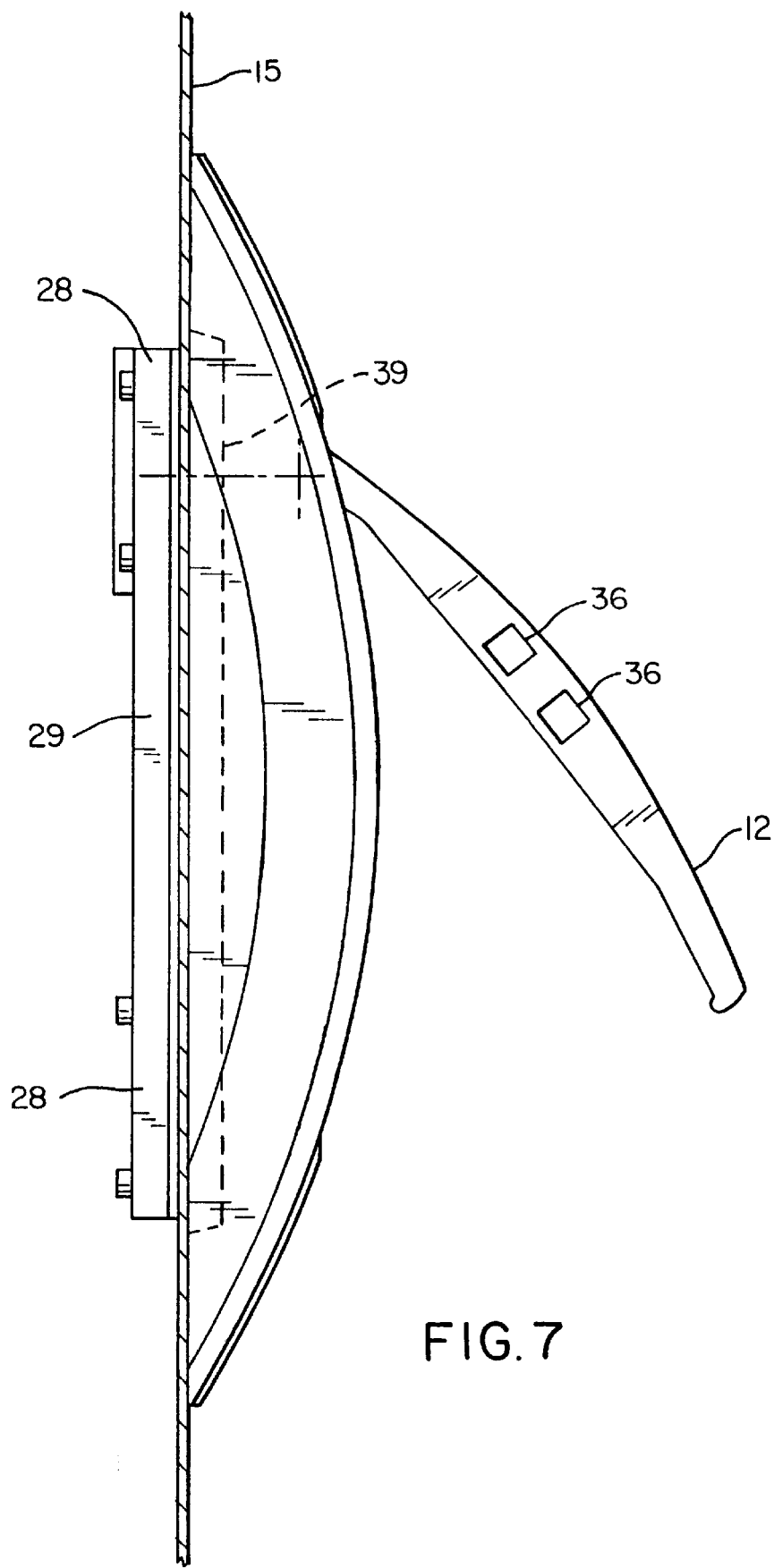
FIG. 7 shows the locking device of FIG. 6 in another embodiment.

In FIG. 7 a further embodiment, similar to the one of FIG. 6, is shown which comprises a plate-shaped member 10 having a recess 39 at its backside facing the door panel 15. The recess 39 is provided to receive a lock cover plate already mounted on the door panel 15 so that it is not necessary to remove the lock cover plate before mounting the inventive locking device.

The present invention is, of course, in no way restricted to the specific disclosure of the specification and drawings, but also encompasses any modifications within the scope of the appended claims.

What I claim is:

1. A locking device for right-hand and left-hand doors of a switch cabinet, said locking device comprising:

at least one locking rod for locking a door of the switching cabinet;

an actuating element for displacing said at least one locking rod in a longitudinal direction thereof for locking and unlocking the door;

a reversible handle connected to an exterior of the door so as to be foldable and rotatable, said handle comprising a transmission shaft for coupling said handle to said actuating element, wherein said actuating element is activated by rotating said handle;

a plate-shaped member, connected to the exterior of the door, said plate-shaped member comprising a depression for receiving said handle, wherein in a folded position of said handle said handle is flush with said plate-shaped member;

said plate-shaped member comprising a receiving portion positioned laterally adjacent to said depression and parallel to said handle;

at least one lock positioned within said receiving portion for locking said handle when folded into said depression, said lock having an insertion axis along which a lock-actuating device is introduced into said lock, wherein said insertion axis is perpendicular to a plane in which said handle is folded, when viewing said handle in a plan view, and positioned at an angle relative to said plane in which said handle is folded, when viewing said handle in an end view;

a transmission element coupled to said lock and slidably connected to said receiving portion for locking and unlocking said handle when acted upon by said at least one lock; and said depression having two opposite ends with a cutout, wherein said transmission shaft is supported at and extends through one of said cutouts when used on a right-hand door and is supported at and extends through the other one of said cutouts when used on a left-hand door.

2. A locking device according to claim 1, wherein said lock is arranged in said receiving portion so as to be parallel to a plane of the door.

3. A locking device according to claim 1, wherein said lock is arranged in said receiving portion so as to be at a slant relative to a plane of the door.

4. A locking device according to claim 1, wherein two of said locks are positioned in said receiving portion.

5. A locking device according to claim 1, wherein:

said receiving portion has a back side placed on the door and a front side facing away from the door;

said receiving portion comprises a lock receiving opening for each one of said locks, said lock receiving opening accessible from said back side; and said front side having a key hole for each one of said locks for accessing said lock.

6. A locking device according to claim 5, further comprising a cover element for one of said key holes.

7. A locking device according to claim 1, further comprising a lock box in which said at least one locking rod is guided, said lock box fixedly connected to the door, wherein said actuating element comprises two pinions positioned in said lock box for driving said at least one locking rod, wherein each one of said pinions is positioned at one of said cutouts and wherein said transmission shaft of said handle engages one of said pinions for driving said at least one locking rod.

8. A locking device according to claim 7, wherein said lock box is a unitary part and extends over a length of said depression.

9. A locking device according to claim 7, wherein:

said lock box comprises two box parts coordinated with said cutouts;

each one of said box parts contains one of said pinions; and said lock box further comprises a bridging member for connecting said box parts to form a unitary lock box.

10. A locking device according to claim 1, wherein said plate-shaped member has a recess at a side thereof placed onto the door, said recess extending over a length of said depression and shaped according to a contour of a lock cover plate mounted to the door.

* * * * *